United States Patent [19]

Grimm

[11] 3,950,085

[45] Apr. 13, 1976

[54] OPTICAL TRANSFORMATION DRAWING APPARATUS

[75] Inventor: Gerhard Grimm, Neutraubling, Germany

[73] Assignee: Krones-Transyscop GmbH, Neutraubling, Germany

[22] Filed: Aug. 25, 1975

[21] Appl. No.: 607,375

[30] Foreign Application Priority Data

Aug. 27, 1974 Germany .............................. 2441072

[52] U.S. Cl. ........................ 353/44; 353/77; 353/79; 353/119; 248/11

[51] Int. Cl.$^{2}$ ..................... G03B 21/10; G03B 21/28

[58] Field of Search ............. 353/40, 44, 74, 77, 79, 353/119; 248/11

[56] References Cited

UNITED STATES PATENTS

| | | | |
|---|---|---|---|
| 405,758 | 6/1889 | Bement | 248/11 |
| 1,306,861 | 6/1919 | Sparkes | 353/44 |
| 1,840,920 | 1/1932 | Spaulding | 353/79 |
| 2,254,368 | 9/1941 | Holbrook | 353/79 |
| 2,474,055 | 6/1949 | Lacey | 353/79 |
| 3,627,241 | 12/1971 | Santirocco | 248/11 |
| 3,880,508 | 4/1975 | Hughes | 353/44 |

*Primary Examiner*—Houston S. Bell, Jr.
*Assistant Examiner*—A. J. Mirabito
*Attorney, Agent, or Firm*—Donald D. Jeffery

[57] ABSTRACT

In an optical transformation drawing apparatus in which an image is projected by a projector on to a rear face of a projection screen so that a draftsman can trace on the front face of the screen the image transmitted through the screen, both the projection screen and a projector support frame supporting the projector are mounted on a fixed frame to pivot about an axis with the projector support frame and the projector thereon acting as a counterweight for the screen and with the projector support frame arranged parallel to the pivot axis, a mirror being provided to deflect the image from the projector on to the rear face of the screen.

4 Claims, 4 Drawing Figures

OPTICAL TRANSFORMATION DRAWING APPARATUS

BACKGROUND OF THE INVENTION

This invention relates to an optical transformation drawing apparatus in which an image is projected on to a rear face of a projection screen so that a draftsman can trace on the front face of the screen the image transmitted through the screen.

Many known apparatuses of this kind are stood non-adjustably on the ground or on a table, with the result that the draftsman is obliged to perform his work in a more or less bent-over posture.

There is a requirement for an optical transformation drawing apparatus which has the operating comfort of modern drawing apparatus, with which the draftsman can carry out his work either in a standing or in a sitting position. This requirement arises on the one hand due to the increase in the filming of drawings on microfilm, from which the draftsman is required to convert details, at the original scale of the drawing, into new drawings. On the other hand, a filming process is used for conversion of drawings to other scales, as for example in vehicle engineering and machine construction, or with an episcope for transforming charts or plans in the building industry. In these cases a distortion-free projected image up to the dimensions of DIN format A0 or a surface area of 1 square meter is desired.

Optical transformation drawing apparatuses of this size are expensive and heavy, as the optical system comprising a projection lamp, an image projection lens, an image holder, an objective lens and the projection screen forms a rigid unit and should not rock.

The expense is further increased if such a system is to be suspended so as to be pivotable so that the draftsman can adjust the inclination and height of the projection screen so as to enable him to work in a comfortable posture.

SUMMARY OF THE INVENTION

An object of the invention is to provide an optical transformation drawings apparatus of the kind set forth above which permits adjustment of the projection surface while being substantially free from any rocking movement.

Another object of the invention is to provide an optical drawing apparatus of the kind set forth above which can be used by a draftsman in either the sitting or the standing position.

In the present invention, the projection screen is mounted pivotally with a projector support frame on a fixed frame structure, and the longitudinal axis of the projector support frame is arranged parallel to the pivotal axis and is arranged with the projector as a counterweight to the projection screen, a mirror serving to deflect the image from the projector on to the projection screen.

With the inventive optical transformation drawing apparatus, the draftsman can draw on a large working surface in a comfortable position, and the working surface can be pivoted over a relatively large angle.

Preferably, a plurality of connecting rods are arranged in the manner of a parallelogram for additional vertical adjustability of the pivotally mounted parts of the apparatus.

By virtue of the face the the image projected from the projector is deflected by the mirror, in accordance with a preferred feature of the invention a particularly rigid projection system can be achieved by disposing between the projection surface and the projector support frame a connecting hood which is supported on both of a pair of mountings spaced apart along and defining the pivotal axis.

BRIEF DESCRIPTION OF THE DRAWINGS

Other objects, features and advantages of the invention will appear from the following exemplary and non-limitative description of optical transformation drawing apparatuses in accordance with the invention and illustrated in the accompanying drawings, in which.

DETAILED DESCRIPTION OF THE PREFERRED EMBODIMENTS

Figure 1:
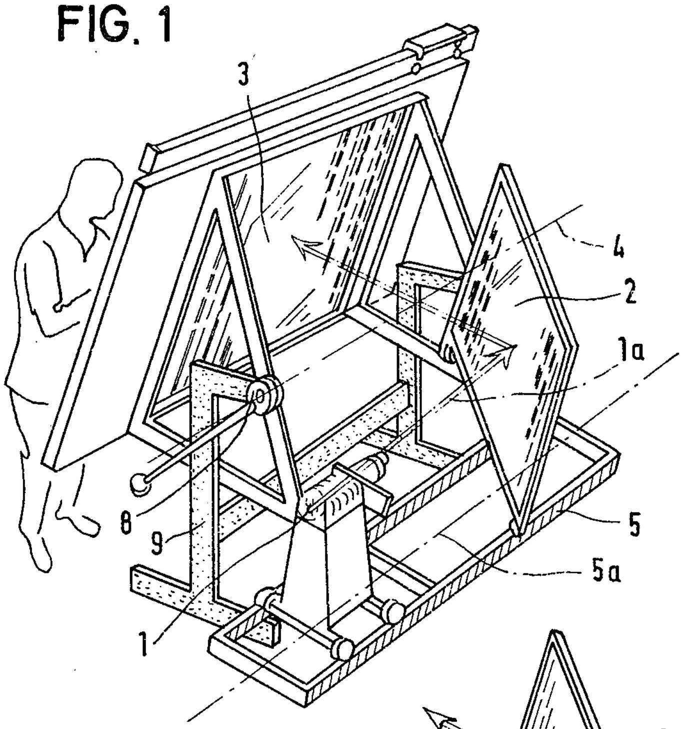
FIG. 1 is a simplified perspective view of an optical transformation drawing apparatus having a microfilm projector.

The apparatus shown in FIG. 1 includes a projection system comprising a microfilm projector 1, a mirror 2, a projector screen 3 which is in the form of a glass plate, and a projector support frame 5 supporting the projector. An image projected from the projector 1 along an axis **1*a* is deflected on to the rear face of the screen 3, i.e. the face visible in FIG. 1. The image is transmitted through the screen 3** to the front face so that it can be traced by a draftsman.

The above-mentioned projection system is pivotally mounted by a pair of pivot mountings 8 on a fixed frame 9, the projector 1 and the support frame 5 therefor acting as a counterweight for the screen. A pivotal axis 4 defined by the mountings 8 extends parallel to a longitudinal axis **5*a* of the projector support frame 5.**

By appropriate construction of a travelling carriage for the projector, a large number of different types of projectors can be fitted in the projector support frame 5. For example, microfilm projectors as shown in FIG. 1, commercially-available reproducing projectors as shown in FIG. 2, still-view projectors, episcopes and other light image projection devices can be used in the apparatus.

Figure 3:
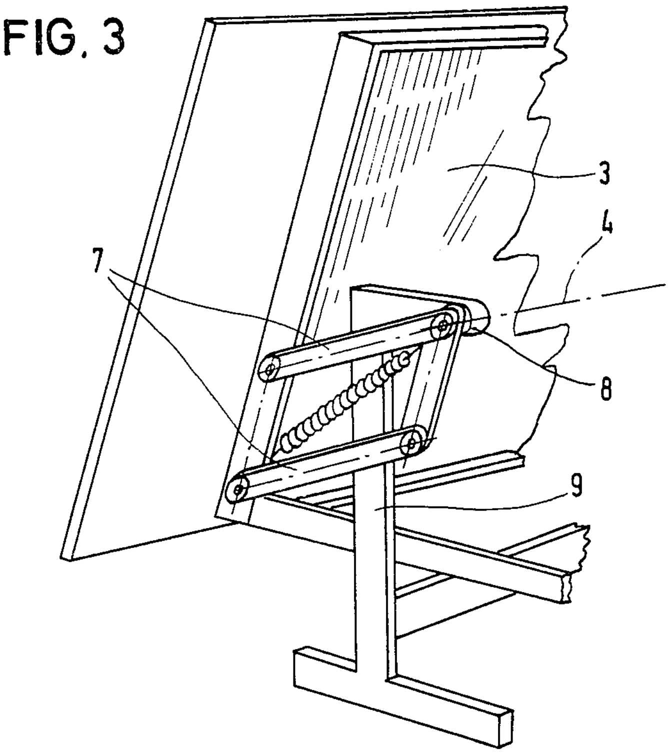
FIG. 3 is a view, corresponding to a part of FIG. 1, of a modified apparatus with connecting rods arranged in the manner of a parallelogram.

As shown in FIG. 3, additional vertical adjustability can be achieved by pivotally connecting the projection screen 3 to the pivot mountings 8 by means of connecting rods 7 arranged in the manner of a parallelogram.

Figure 4:
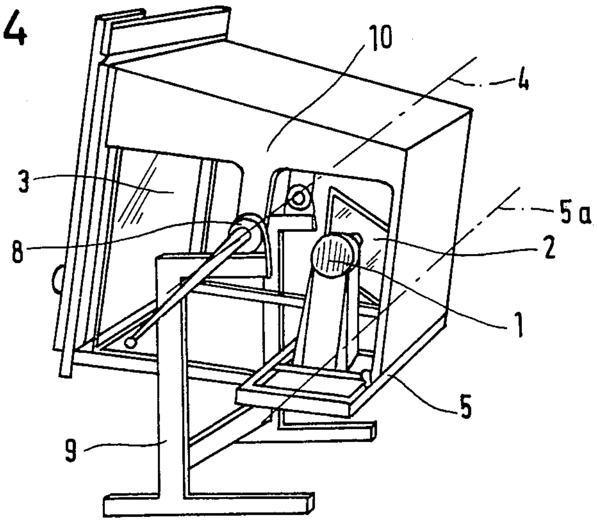
FIG. 4 shows an apparatus corresponding to that shown in FIG. 1, but fitted with a connecting or supporting cover or hood.

The strength of the apparatus can be improved as shown in FIG. 4 by means of a cover or hood 10 which is connected between the screen 3 and the projector support frame 5 and is also supported at its sides on the mountings 8. This arrangement provides a sufficient degree of rigidity and ensures that the projected image is not caused to vibrate by the knocks on the drawing surface caused by the draftsman.

Figure 2:
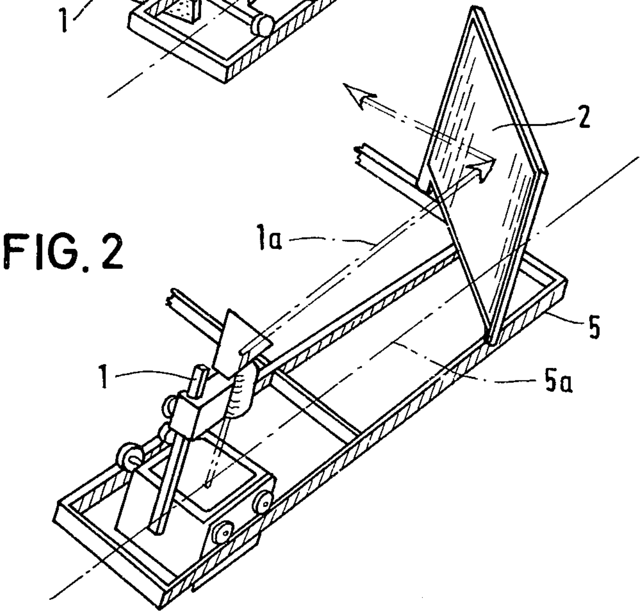
FIG. 2 is a view, corresponding to a part of FIG. 1, of an apparatus which is the same as that of FIG. 1 except that it is fitted with a reproducing projector for DIN A4 film.

The image which is produced by the projectors 1 in FIGS. 1 and 2 is deflected in each case by the mirror 2 on to the rear face of the projection screen 3. The projection screen 3 can be a clear glass plate or a frosted or gound glass plate. Clear glass is particularly advantageous as the drawing material is transparent, and account must be taken of warping. With a clear glass plate, in contrast to a ground glass plate, the projected image will remain sufficiently clear if there is an air gap between the front face of the screen and the drawing material.

I claim:

1. In an optical transformation drawing apparatus comprising a projection screen having front and rear faces and a projector for projecting an image on to said rear face of said projection screen to enable a draftsman to trace on said front face of said screen said image which is transmitted through the screen, the improvement comprising a fixed frame (9), a projector support frame (5) supporting said projector (1), means mounting both said projection screen (3) and said projector support frame (5) to said fixed frame (9) for pivotal movement about an axis (4) with said projector support frame (5) and the projector (1) thereon acting as a counterweight to said projection screen (3) and with said projector support frame (5) arranged parallel to said axis (4), and a mirror (2) adapted to deflect said image projected from said projector on to said rear face of said projection screen (3).

2. Apparatus according to claim 1, further comprising a plurality of connecting rods (7) arranged in the manner of a parallelogram for additional vertical adjustability of said pivotally-mounted parts of the apparatus.

3. Apparatus according to claim 1, wherein said pivotal mounting means comprises a pair of mountings (8) spaced apart along and defining said axis (4) and a connecting hood (10) is disposed between said projection screen (3) and said projector support frame (5), said hood being supported at both of said mountings (8).

4. Apparatus according to claim 2, wherein said pivotal mounting means comprises a pair of mountings (8) spaced apart along and defining said axis (4) and a connecting hood (10) is disposed between said projection screen (3) and said projector support frame (5), said hood being supported at both of said mountings (8).

* * * * *